(No Model.) 2 Sheets—Sheet 1.
J. D. CROCKETT.
MUZZLE.
No. 305,296. Patented Sept. 16, 1884.
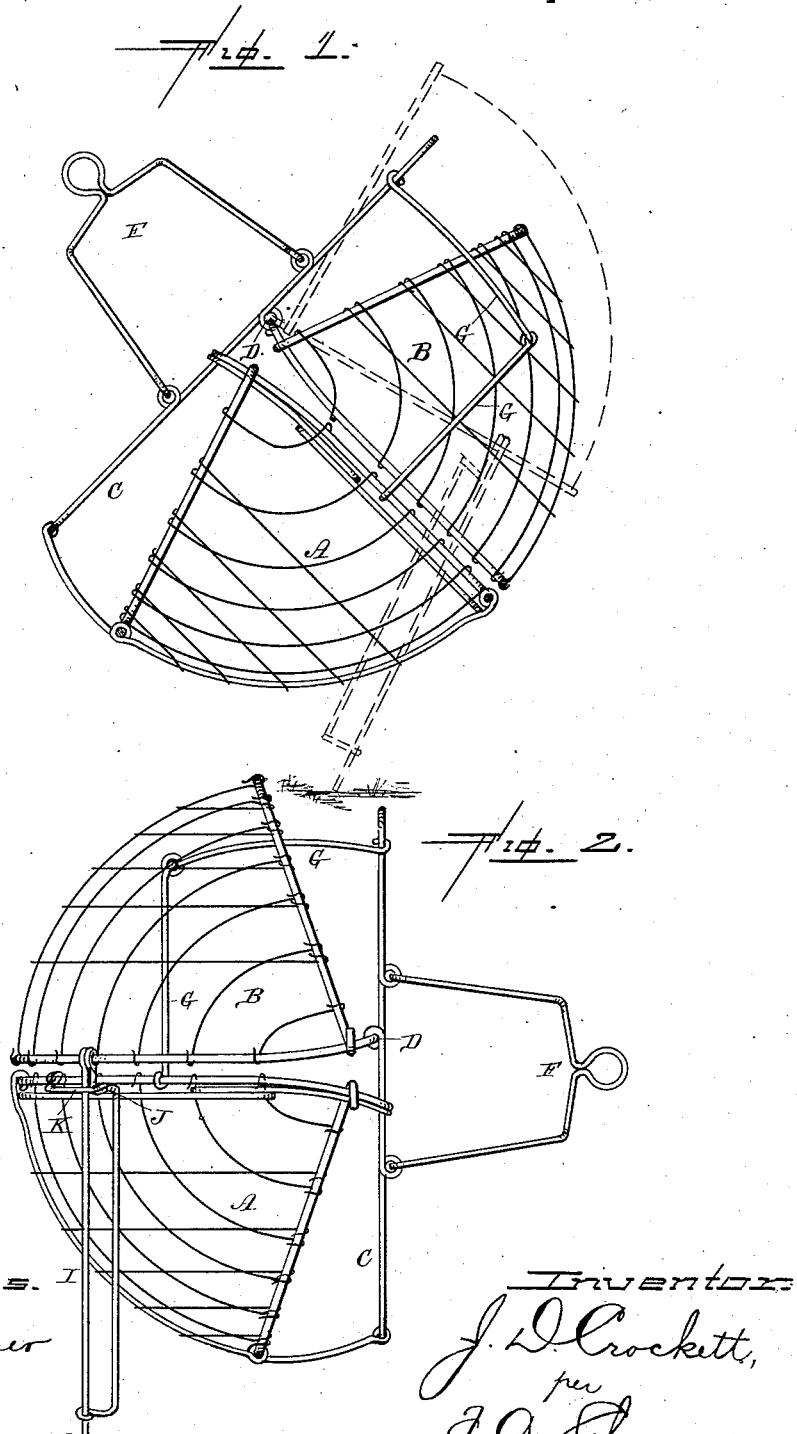

(No Model.)  2 Sheets—Sheet 2.
J. D. CROCKETT.
MUZZLE.
No. 305,296. Patented Sept. 16, 1884.
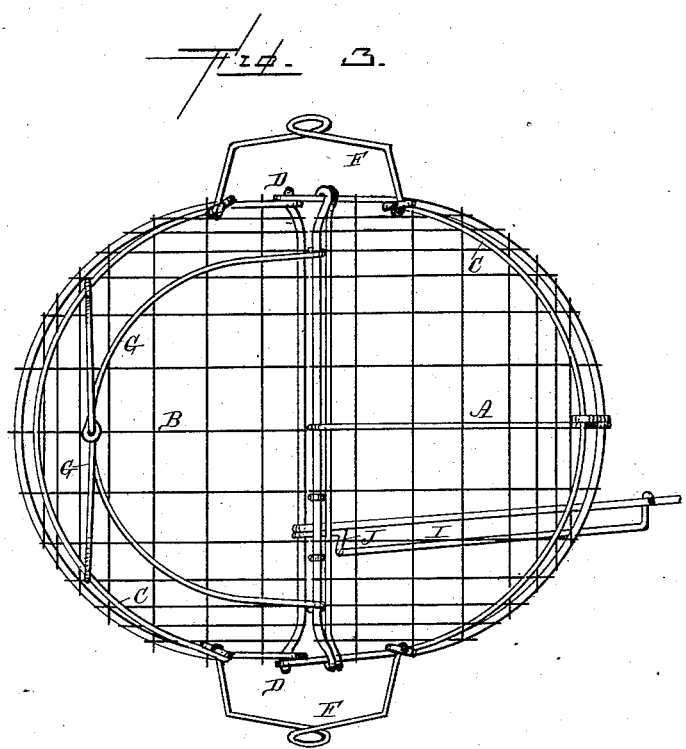

UNITED STATES PATENT OFFICE.

JAMES DAVIS CROCKETT, OF RIPLEY, MISSISSIPPI.

MUZZLE.

SPECIFICATION forming part of Letters Patent No. 305,296, dated September 16, 1884.

Application filed June 28, 1884. (No model.)

*To all whom it may concern:*

Be it known that I, J. D. CROCKETT, of Ripley, in the county of Tippah and State of Mississippi, have invented certain new and useful Improvements in Muzzles; and I do hereby declare the following to be a full, clear, and exact description of the invention, such as will enable others skilled in the art to which it pertains to make and use it, reference being had to the accompanying drawings, which form part of this specification.

My invention relates to an improvement in muzzles; and it consists, first, in a muzzle, which is formed of a stationary part which comes under the lower jaw and a movable part which fits over the upper jaw, a stationary frame, which is attached to the movable jaw, and a push-rod for moving the upper movable part of the muzzle when the animal lowers its head to the ground; second, in the combination of the stationary part of the muzzle provided with a loop, with the movable portion provided with a push-rod, having a shoulder thereon, and which push-rod is adapted to lock the upper part of the muzzle in position when the animal raises its head upward, all of which will be more fully described hereinafter.

The object of my invention is to produce a muzzle which is specially adapted for weaning small animals, and which will freely open when the animal lowers its head to the ground, and which will close and lock itself when the animal raises its head upward for the purpose of biting a tree or other similar object.

Figure 1 is a vertical cross-section of a muzzle embodying my invention. Fig. 2 is a side elevation of the muzzle, showing the locking-rod provided with a shoulder. Fig. 3 is a plan view.

A represents the lower stationary part of the muzzle, which comes just under the animal's lower jaw, and B the movable upper portion of the muzzle, which comes over the top of the animal's mouth. The lower part, A, is rigidly secured to the wire frame C, while the upper part is pivoted thereto at the points D on opposite sides. The lower jaw is rigidly secured to the frame, so that it shall have no movement whatever, while the upper jaw is pivoted thereto, so that it can be raised outward from the lower portion, and thus allow the animal to freely graze or eat when the head is hanging downward. In order to brace the front part of the frame C and the lower part, A, of the muzzle rigidly together, the two wires G are used. These wires extend diagonally across the inner side of the muzzle, and are twisted together at their centers, so as to give them strength. The lower part, A, and the frame C are thus rigidly secured together. The whole muzzle is supported by means of a cord or strap, which passes up over the animal's head, and which is secured upon opposite sides of the two loops F.

In order to operate the movable part B of the muzzle, a push-rod, I, is provided. If it is desired to lock the upper part, so that it is impossible for the animal to open it when the mouth is raised, the push-rod will be provided with a shoulder, J, and this rod will then pass through a suitable guiding-loop, K. This shoulder J consists in a bend or offset, which is formed near the upper end of the push-rod, and which catches against the under side of the loop K, so as to act as a stop to prevent the muzzle from opening. When the animal's head is lowered, the weight of this push-rod will cause it to drop forward in such a manner that when its lower end comes in contact with the ground it will push freely upward through the guiding-loop without giving the shoulder a chance to catch against it. Should, however, the animal raise its mouth upward, this push-rod swings backward, so that the shoulder catches under the loop, and thus forms a lock. In this manner young animals are prevented from sucking and older animals are prevented from eating trees or from eating anything which is above their heads. The two parts of the muzzle being fastened together, as here shown, the muzzle opens outward in a line with the mouth, instead of at right angles to it, as is common in many muzzles. By opening out in the manner here shown the animal can eat much more freely than where the muzzle opens at right angles to the mouth.

Having thus described my invention, I claim—

1. A muzzle composed of the stationary part A, which comes under the lower jaw, frame C, and wire G, a movable part which comes over the upper jaw, and a push-rod, which is connected to the upper part for the purpose of opening it to allow the animal to graze, substantially as shown.

2. The combination of the stationary portion of the muzzle, the movable portion B, and the frame C, to which the two parts are fastened, substantially as set forth.

3. The combination of a muzzle composed of a stationary part, A, and a movable part, B, with the push-rod provided with a shoulder, and which is adapted to lock the parts of the muzzle together when the animal raises its head, substantially as specified.

4. In a muzzle, the combination of the stationary part A, the movable part B, the frame C, a guiding-loop, and a push-rod provided with a shoulder, J, substantially as shown and described.

In testimony whereof I affix my signature in presence of two witnesses.

JAMES DAVIS CROCKETT.

Witnesses:
 PRESTON JONES,
 JAMES HARRISON.